United States Patent Office 2,759,004
Patented Aug. 14, 1956

2,759,004

RECOVERY OF OXYGENATED STEROIDS FROM AQUEOUS FERMENTATION MEDIA

Samuel H. Eppstein and Hazel Marian Leigh, Kalamazoo, Mich., assignors to The Upjohn Company, Kalamazoo, Mich., a corporation of Michigan No Drawing. Application August 13, 1952,
Serial No. 304,222

11 Claims. (Cl. 260—397.45)

This invention relates to steroids, more particularly to the recovery of steroids from aqueous medium.

An object of this invention is to provide a process of recovering a purified steroid from an aqueous dispersion of steroid. Another object is to provide an improved process of removing steroid from a fermentation medium without the use of liquid-liquid phase solvent extractions and the concomitant solvent loss and emulsion problems. A further object is to remove steroid from an aqueous dispersion by an adsorbent which may then serve as the chromatographic adsorbent in a subsequent elution. Additional objects will be apparent to experts in the art to which this invention pertains.

The aqueous fermentation media to which this invention is applicable may result from a variety of steroid fermentations involving different chemical transformations but all amenable to steroid recovery as herein described. The fermented steroid results from the fermentation of steroid by organic tissues, enzymes, or microorganisms, illustratively Euthallophyta inclusive of Schizomycetes, Eumycetes, Lichenes and Algae. Following the fermentation of steroid using, for example, tissue perfusion or brew as in Haines, "Studies on the Biosynthesis of Adrenal Cortex Hormones," from Recent Progress in Hormone Research, vol. VII, Academic Press Inc., N. Y., 1952; Streptomyces as in Colingsworth, Brunner and Haines, J. Am. Chem. Soc., 74, 2381 (1952); Mucorales as in the Murray and Peterson Patent 2,602,769, issued July 8, 1952; Phycomyces, Eremothecium or Ustilago as in Perlman, Science, 115, 529 (1952); Yeast (reduction), Mamdi and Vercellone, Ber., 70B, 470 (1934); Corynebacterium, Mamoli, Ber., 71, 2701 (1938); Azotobacter, Horvath and Kramli, Nature, 160, 639 (1947); Proactinomyces, Horvath and Kramli, Nature, 163, 219 (1949) instead of the cumbersome method heretofore used, namely the extraction of fermented steroid from the aqueous medium by means of solvents, it has been found unexpectedly advantageous to separate fermented steroid from aqueous material by contacting activated carbon with the fermentation medium containing fermented steroid. The activated carbon may be used in a wide and not especially critical concentration which may suitably vary from about twenty parts of carbon to 200 parts of carbon per one part of steroid although higher and lower ratios may satisfactorily be employed. It is desirable but not essential to agitate a mixture of the activated carbon and fermentation medium to facilitate selective adsorption of the steroid upon the activated carbon. While temperature, contact time and degree of agitation are not critical, room temperature is convenient and successful, and five minutes of moderate stirring provides sufficent time of contact for adsorption of fermented steroid by the adsorptive carbon. The activated carbon may be preferably added after the completion of fermentation. The activated carbon adsorbent may be advantageously contacted with fermentation media containing fermented steroid either in the presence or absence of particulate material. Accordingly, tissue homogenate, or microorganisms such as yeast or fungi need not be removed from the media prior to contact with activated carbon. Subsequent separation of the fermented steroid bearing-activated carbon, for example, by decantation, centrifugation or filtration, may be used. A filter-aid, illustratively diatomaceous earth, may be incorporated in the activated carbon slurry to improve filtration. The presence of activated carbon along with particulate matter such as tissue, undisrupted microorganisms or mycelium facilitates the separation or filtration of the solid matter from the aqueous solution. The thus-separated activated carbon and accompanying fermented steroid and particulate matter may be extracted by slurrying with a steroid solvent and separating the extract and solid phase or by passing extracting solvent through a bed of steroid bearing-activated carbon. In lieu of direct extraction, the steroid bearing-activated carbon may be subjected to chromatographic elution and a selective solvent or a series of solvents so as to obtain the preferred steroid in an elution fraction.

The following examples are illustrative of the process of the present invention and are not to be construed as limiting.

EXAMPLE 1

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Eight liters of this sterilized medium was inoculated with *Rhizopus nigricans* minus strain, American Type Culture Collection No. 6227b, and incubated for 24 hours at a temperature of 28 degrees centigrade using a rate of aeration and agitation such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Rhizopus nigricans* was added two grams of 11-desoxy-17-hydroxycorticosterone dissolved in a minimum of acetone. After an additional 24-hour period of incubation the beer was filtered. Three separate fifty-milliliter portions of the beer filtrate were each treated respectively with one-gram, five-gram or ten-gram portions of Nuchar activated carbon for five minutes and then the mixture was filtered.

The separated carbon residues were slurried with methanol into chromatograph columns and eluted with solvents as given in Table I. The eluate fractions were concentrated and the components were separated and analyzed by paper chromatography.

EXAMPLE 2

Otherwise in accordance with Example 1, four grams of progesterone was added to eight liters of medium and fermented with *Rhizopus nigricans* for 24 hours. To the entire beer, 160 grams of Darco G–60 activated carbon and 640 grams of Celite diatomaceous earth filter-aid was added, the mixture was agitated for five minutes and then filtered. The residue was washed with water until the washings were colorless.

The carbon-filter-aid residue containing the adsorbed steroids was divided into two equal portions each representing two grams of starting progesterone.

One portion of the residue was slurried into a glass column with water and eluted as indicated in Table II. Percent analysis was by paper chromatogram.

The other half of the carbon adsorbate was dried at sixty degrees centigrade to give a dry weight of 453 grams. Ten-gram aliquots of this represent 44.15 milligrams of starting progesterone. Such aliquots were extracted with various solvents in a Soxhlet apparatus and the extracts were evaluated by paper chromatography. The results with some of the solvents are given in Table III.

A similar ten-gram aliquot of the carbon adsorbate was extracted with methylene chloride in a Soxhlet apparatus and by direct crystallization yielded 20.2 milligrams of crystals, melting at 156 to 162 degrees centigrade.

EXAMPLE 3

Following the aerobic fermentation by *Rhizopus nigricans* upon forty milligrams of compound S, 11-desoxy-17-hydroxycorticosterone, the entire beer was shaken with 1.6 grams of Darco G-60 activated carbon and then maintained at five degrees centigrade for fifteen hours. Then 6.4 grams of Celite filter-aid was added and the suspension was filtered. The filtration residue was washed with water until the washings were nearly colorless, dried at 45 degrees centigrade in vacuum and extracted in a Soxhlet apparatus with chloroform-methanol azeotrope. The extract was analyzed and separated by paper chromatography to show epi F ($11\alpha$,17-dihydroxycorticosterone) and compound S as having been recovered from the carbon adsorbate.

EXAMPLE 4

A 250-milliliter aliquot of whole beer from the *Rhizopus nigricans* aerobic fermentation of $17\alpha$-hydroxyprogesterone was filtered. The mycelium was extracted with a ten-milliliter and again with a five-milliliter portion of boiling methanol, and the extract was added to the beer filtrate. The total solution of methanol extract and beer filtrate was divided into two equal portions. One portion of the solution was stirred for ten minutes with 3.13 grams of Darco G-60 activated carbon and 12.5 grams of Celite filter-aid, and then filtered. The filtration residue was washed with water until the washings were nearly colorless. The residue was dried at 45 degrees centigrade in vacuum and extracted with methylene chloride in a Soxhlet apparatus to yield 0.13 gram of extractive solids consisting, based upon the starting steroid, of 19.7 percent of $17\alpha$-hydroxyprogesterone, 15.6 percent of $11\alpha,17\alpha$-dihydroxyprogesterone, and 6.25 percent of a more polar material.

The other aliquot of the beer filtrate and methanol extract of mycelium was poured over a column covered with water and containing 3.13 grams of activated carbon mixed with 12.5 grams of Celite diatomaceous earth, and eluted with solvents as indicated in Table IV using 42-milliliter portions of solvent. Paper chromatography analysis is reported in milligrams.

EXAMPLE 5.—$11\alpha$-HYDROXYPROGESTERONE

Following the *Rhizopus nigricans* aerobic fermentation of two grams of progesterone in four liters of medium, a 200-milliliter aliquot, equivalent to 100 milligrams of progesterone, was stirred for thirty minutes with four grams of activated carbon and then filtered. The residue was twice slurried for five minutes with seventy-milliliter portions of methanol and filtered each time. The methanol filtrates were evaporated to dryness to give fraction A.

The residual carbon was slurried three times for five minutes with thirty-milliliter portions of methylene chloride. The carbon was then mixed with 76 grams of Celite diatomaceous earth filter-aid and slurried three times with 65-milliliter portions of methylene chloride. All of the methylene chloride filtrates were combined and evaporated to dryness to give fraction B.

The remaining filter cake from the above extraction was then extracted in a Soxhlet apparatus with methylene chloride and the extract was evaporated to dryness to give fraction C.

Percent analysis of the fractions as determined by paper chromatography is given in Table V.

Table I.—Chromatography of carbon adsorbate

| Carbon | 1 gram 60-milliliter | | | 5 grams 60-milliliter | | | 10 grams 100-milliliter | | |
|---|---|---|---|---|---|---|---|---|---|
| Solvents | Eluate solids, mg. | Epi F, mg. | S, mg. | Eluate solids, mg. | Epi F, mg. | S, mg. | Eluate solids, mg. | Epi F, mg. | S, mg. |
| Methanol | 70 | 0 | 0 | 220 | 0 | 0 | 419 | 0 | 0 |
| Hexane | 21 | 0 | Tr. | 19 | 0 | | | | |
| Hexane-$CH_2Cl_2$, 1:1 | 34 | 0 | Tr. | 16 | 0 | Tr. | | | |
| Methanol-$CH_2Cl_2$, 1:1 | | | | | | | 109 | 0 | 0 |
| $CH_2Cl_2$ | 29 | 0.23 | 6.24 | 11 | 0.02 | 0.22 | 29 | 2.50 | 1.17 |
| Methanol-$CH_2Cl_2$, 1:1 | 193 | 1.85 | 2.00 | 64 | 3.12 | 3.24 | | | |
| Acetone | | 0.22 | 0 | 1.2 | 0.2 | 0.04 | 3.8 | 2.4 | 0.53 |
| Totals | | 2.30 | 8.24 | | 3.34 | 2.60 | | 4.9 | 1.87 |

Table II

| 800-Milliliter portions of solvent | Eluate solids, milligrams | $11\alpha$-Hydroxyprogesterone | Progesterone |
|---|---|---|---|
| Methanol-water 1:1 | 950 | 0 | 0 |
| Do | 1,240 | | |
| Methanol-water 7:3 | 1,190 | 0 | 0 |
| Do | 710 | | |
| Methanol-water 4:1 | 400 | | |
| Do | 260 | | |
| Methanol-water 9:1 | 240 | | |
| Do | 190 | 10 | 0 |
| Methanol | 80 | | |
| Do | 100 | | |
| Methylene chloride-methanol 1:19 | 140 | | |
| Do | 200 | 20 | 0 |
| Methylene chloride-methanol 1:9 | 170 | | |
| Do | 170 | | |
| Methylene chloride-methanol 1:4 | 200 | 41 | 0 |
| Do | 310 | | |
| Methylene chloride-methanol 3:7 | 370 | | |
| Do | 410 | 41 | Trace |
| Methylene chloride-methanol 1:1 | 310 | | |
| Do | 390 | 41 | 6 |
| Do | 170 | | |
| Do | 140 | | |
| Do | 60 | | |
| Do | 30 | 10 | 81 |
| Methylene chloride | 30 | | |
| Do | 30 | | |
| Do | 0 | | |

Table III

| Solvent | $11\alpha$-Hydroxyprogesterone, milligrams | Progesterone, milligrams |
|---|---|---|
| Methylene chloride | 24.67 | 7.5 |
| Chloroform-methanol azeotrope | 11.53 | 7.5 |
| Ethyl acetate | 16.3 | 5.02 |
| Methanol | 8.2 | 0.14 |

Table IV

| Solvent | Eluate solids, milligrams | 17α-Hydroxy-progesterone | 11α,17α-dihydroxy-progesterone | More polar spot |
|---|---|---|---|---|
| | | Percent | Percent | Percent |
| Water | 350 | 0 | 0 | 0 |
| Do | 155 | 0 | 0 | 0 |
| Methanol-water 3:1 | 215 | 0 | 0 | 0 |
| Do | 204 | 0 | 0 | 0 |
| Do | 77 | 0 | 3.0 | 0 |
| Do | 37 | 0 | 0.5 | 0 |
| Methanol | 20 | | .6 | |
| Do | 17 | 2.5 | 1.3 | |
| Do | 10 | | .47 | 0.25 |
| Do | 9 | | .4 | .2 |
| Methanol - methylene chloride 1:1 | 40 | 0.5 | 3. | 2.0 |
| Do | 35 | | 2.44 | 1.46 |
| Do | 13 | | 0.43 | 0 |
| Do | 9 | | 0.58 | |
| Methylene chloride | 22 | Trace | .7 | 2.4 |
| Do | 10 | 0 | 0 | 0 |
| Do | 3 | 0 | 0 | 0 |
| Do | 3 | 0 | 0 | 0 |
| Total | | | 12.47 | 6.31 |
| Based on starting material | | | 38.9 | 20.2 |

Table V

| Fraction | A | B | C | B plus C |
|---|---|---|---|---|
| Dihydroxyprogesterone | .002 | 1.25 | 1.96 | 3.25 |
| 11α-Hydroxyprogesterone | 0.022 | 43.8 | 12.3 | 56.10 |
| Progesterone | 0.004 | 7.8 | 1.0 | 8.8 |

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A process comprising contacting an aqueous fermentation medium containing microbiologically fermented steroid from the starting steroid class consisting of progesterone, 17α-hydroxyprogesterone and 11-desoxy-17-hydroxycorticosterone and the associated fermenting microorganisms with activated carbon, separating the microorganisms together with fermented steroid bearing-activated carbon from the fermentation medium, and solvent extracting fermented steroid from the thus-separated microorganisms and fermented steroid bearing-activated carbon.

2. The process of claim 1 wherein the microorganisms are Euthallophyta.

3. The process of claim 1 wherein the microorganisms are fungi.

4. The process of claim 1 wherein the microorganisms are of the order Mucorales.

5. A process comprising contacting an aqueous fermentation medium containing microbiologically fermented steroids with activated carbon whereby the fermented steroid is adsorbed on the activated carbon, separating from the fermentation medium the fermented steroid bearing-activated carbon, and chromatographically eluting purified fermented steroid from the thus-separated activated carbon.

6. A process comprising contacting an aqueous fermentation medium containing microbiologically fermented steroid and the associated fermenting microorganisms with activated carbon, separating the undisrupted microorganisms together with fermented steroid bearing-activated carbon from the fermentation medium, contacting the thus-separated microorganisms and fermented steroid bearing-activated carbon with solvent to extract the fermented steroid, and separating the solvent extract from the microorganisms and activated carbon.

7. The process of claim 6 wherein the microorganisms are Euthallophyta.

8. The process of claim 6 wherein the microorganisms are fungi.

9. The process of claim 6 wherein the microorganisms are fungi of the order Mucorales.

10. In a process of purifying fermented steroid, the steps comprising contacting aqueous fermentation medium containing fermented steroid with activated carbon whereby the fermented steroid is adsorbed on the activated carbon, separating the fermented steroid bearing-activated carbon from the fermentation medium, and subjecting the thus-separated activated carbon to chromatographic elution whereby purified fermented steroid is obtained in an eluate fraction.

11. A process comprising contacting an aqueous medium containing a dispersion of steroid with activated carbon, separating the resulting steroid bearing-activated carbon from the aqueous medium, and chromatographically eluting the activated carbon to obtain an eluate fraction containing purified steroid.

References Cited in the file of this patent

UNITED STATES PATENTS

| | | |
|---|---|---|
| 2,399,840 | Wachtel | May 7, 1947 |
| 2,432,638 | Wachtel | Dec. 16, 1947 |
| 2,446,574 | Cavallito | Aug. 10, 1948 |
| 2,602,769 | Murray et al. | July 8, 1952 |